United States Patent [19]
Murphy

[11] 3,977,801

[45] Aug. 31, 1976

[54] CONNECTOR FOR STRUCTURAL MEMBERS

[76] Inventor: Thomas Philip Murphy, 10 Heather Place, Brampton, Ontario, Canada

[22] Filed: Nov. 22, 1974

[21] Appl. No.: 526,104

[52] U.S. Cl. .............................. 403/189; 248/224
[51] Int. Cl.[2] ..................... F16B 7/04; F16L 41/00
[58] Field of Search .......... 403/189, 406; 52/758 R, 52/758 C, 758 D, 758 F, 753 R, 753 C, 753 D, 754, 756, 645; 248/224, 243; 211/176, 177

[56] References Cited
UNITED STATES PATENTS

| | | | |
|---|---|---|---|
| 1,247,938 | 11/1917 | Curtenius | 248/224 |
| 1,337,012 | 4/1920 | Goodwin | 248/224 X |
| 1,677,362 | 7/1928 | Oberdorfer | 52/645 |
| 1,790,977 | 2/1931 | De Boer | 248/224 X |

Primary Examiner—Wayne L. Shedd

[57] ABSTRACT

A device for laterally interconnecting structural members such as beams and columns. The device comprises a plate with a face and a circumscribing edge, at least one slot extending inwardly from the edge and at least one stud extending outwardly from the face of the plate means. Two such plates, one inverted, fixed to a pair of structural members, are interconnected by passing them contiguously and in parallel to have the stud of one plate enter the slot of the other plate. Preferably there are two parallel slots and two studs in the plate means, the closed ends of the slots and the studs forming a rectangle. In an I-column the upper portion of the flange may be used as one plate and below the upper portion of the column the plate may take the form of a bracket.

15 Claims, 8 Drawing Figures

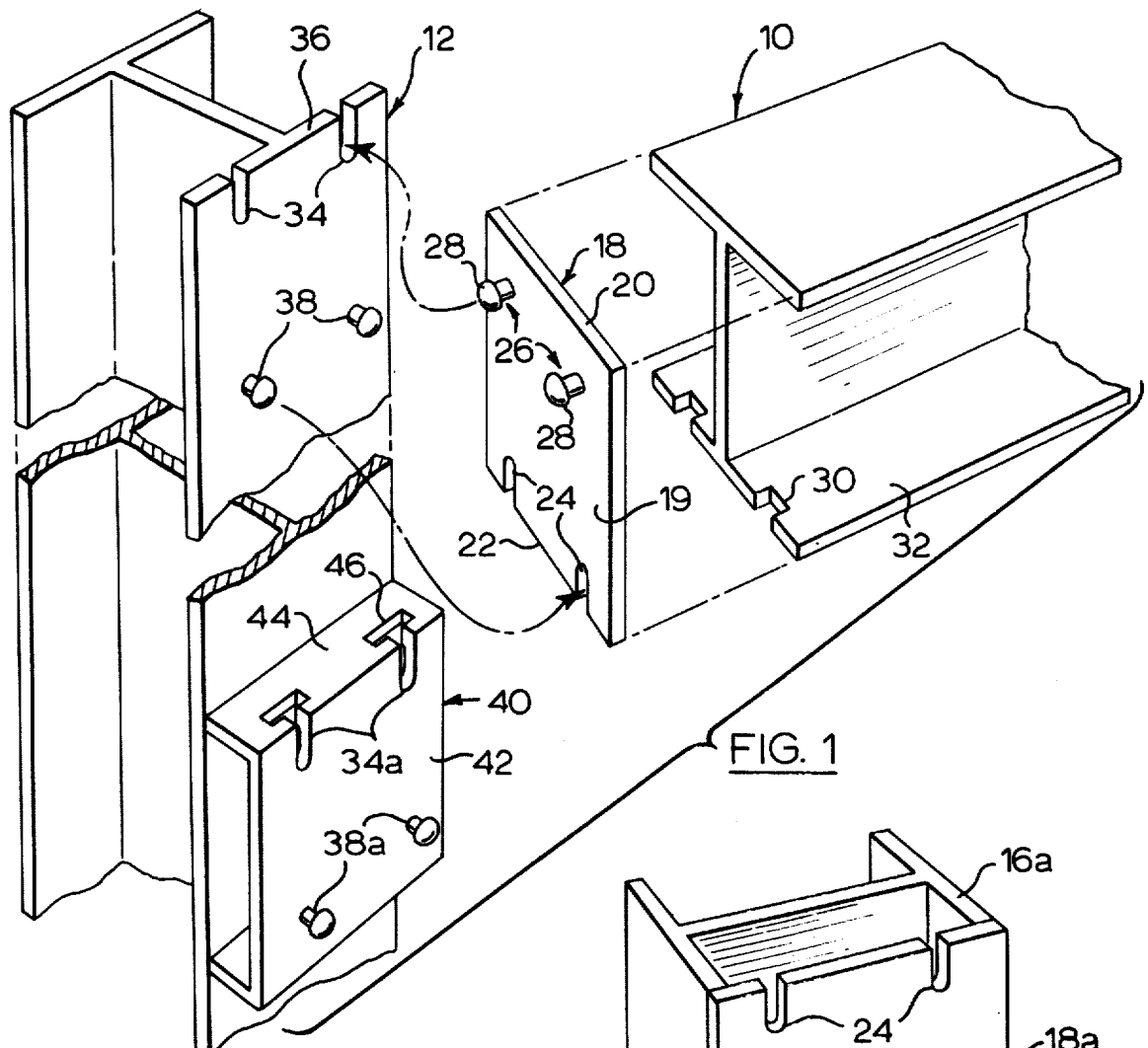
FIG. 1
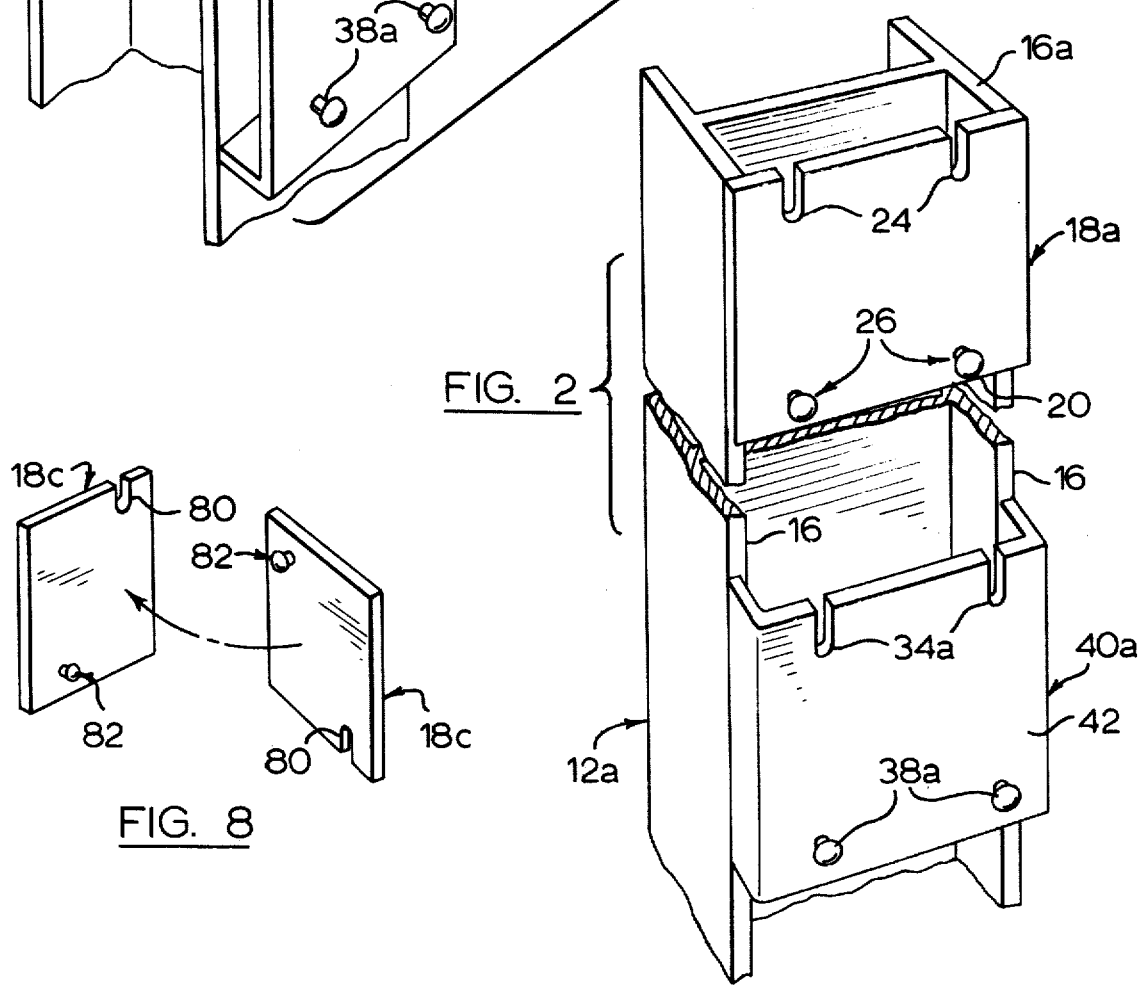
FIG. 2
FIG. 8

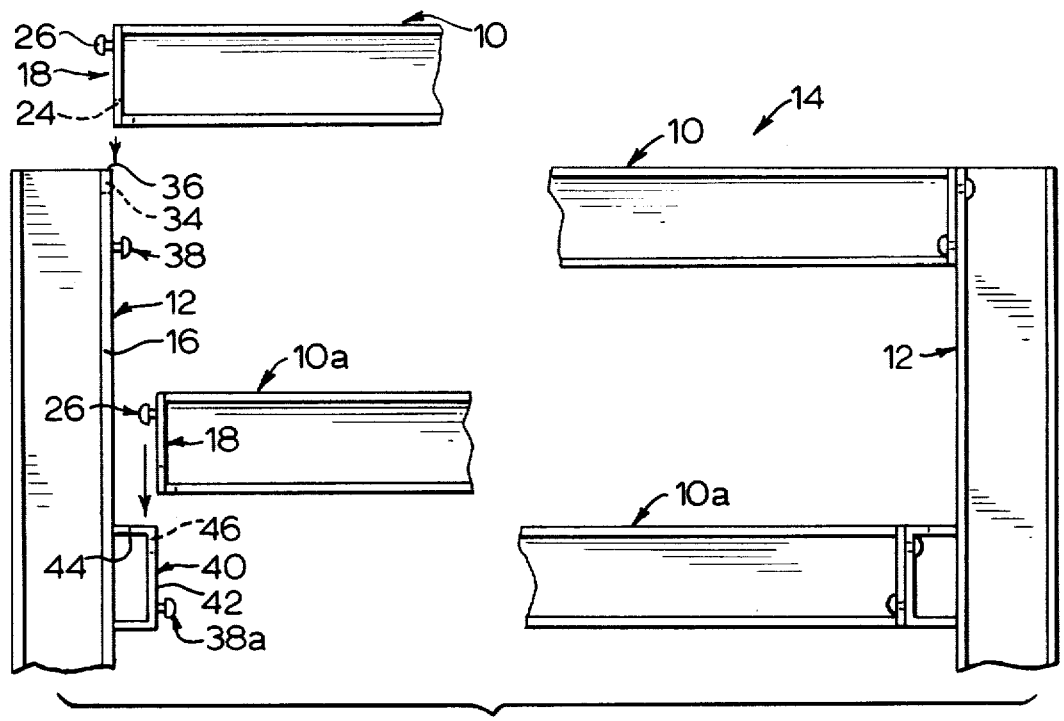
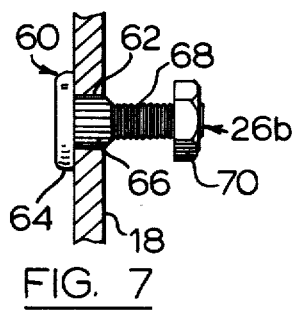
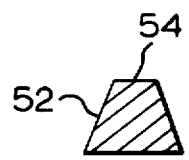
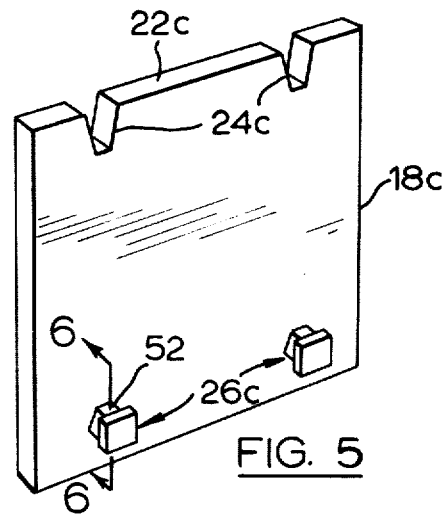
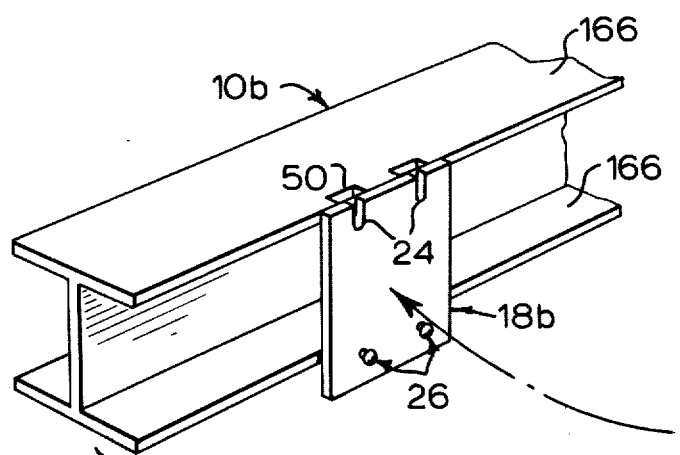
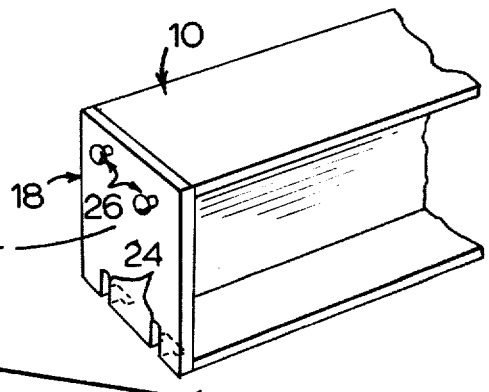

CONNECTOR FOR STRUCTURAL MEMBERS

This invention relates to the interconnection of structural members such as beams and columns.

When fabricating a steel structure of beams and columns, each beam is swung into place between pairs of columns and rivets or bolts are placed in pre-drilled matching holes located in the columns and in flanges fixed to the beams.

This procedure is laborious because the holes in the beam and columns must be held in alignment while a workman fixes bolts or rivets in each pair of aligned holes.

It is an object of the present invention to provide a simplified device for interconnecting structural members.

In its broadest aspect the invention consists of a device for use in laterally interconnecting two structural members, comprising plate means having a planar face and a circumferential edge, at least one slot in the plate means extending from the edge of the plate means, and at least one stud projecting outwardly from the face of the plate means. Preferably there are a pair of parallel slots and a pair of studs, the closed ends of the slots and the studs forming a rectangle.

An example embodiment of the invention is shown in the accompanying drawings in which:

FIG. 1 is an exploded perspective view of a beam and column employing interconnecting devices on a I-beam and on one flange of an I-column;

FIG. 2 is a perspective view of the column of FIG. 1 but showing elements of the interconnecting devices bridging the flanges of the column;

FIG. 3 is a view in elevation showing the steps of interconnecting the beam and column of FIG. 1;

FIG. 4 is an exploded perspective view of a beam interconnected at right angles with another beam;

FIG. 5 is a perspective view of a plate showing an alternate configuration of the slots and studs of the interconnecting device of FIG. 1;

FIG. 6 is a cross-sectional view taken along line 6-6 of FIG. 5;

FIG. 7 is a cross-sectional view of an interconnecting device showing a ferruled bolt fixed as a stud to the plate; and FIG. 8 is an exploded perspective view showing an alternate embodiment of the interconnecting devices of the type shown in FIG. 4.

In the example embodiment shown in FIGS. 1 and 3 of the drawings a beam 10 is interconnected with a pair of columns 12 to form a structural frame 14. To attach beam 10 to the top end of column 12 abutting flange 16 of the column, a plate 18 is fixed vertically to the end of the beam, for instance by welding. Plate 18 is preferably a rectangular planar member having a thickness equal to the thickness of flange 16 of column 12. Plate 18 has an outer face 19, an upper horizontal edge 20 and a parallel lower edge 22. A pair of laterally spaced slots 24 are located in plate 18 and extend vertically upward a short distance from lower edge 22 of the plate. Adjacent upper edge 20 of plate 18 a pair of laterally spaced, horizontally aligned studs 26 are located in vertical alignment with slots 24 to form a rectangle with the closed ends of the slots. Each stud 26 has a head 28 spaced from face 19 of plate 18 a distance at least equal to the thickness of the plate. In the particular embodiment the distance between upper edge 20 and lower edge 22 of plate 18 is equal to the depth of beam 10 and therefore recesses 30 are located in lower flange 32 of the beam behind slots 24 to pass the heads of the studs on column 12.

In the embodiment of FIG. 1, the upper end portion of flange 16 of column 12 serves as the equivalent of plate 18 with a pair of laterally spaced slots 34 extending downwardly from upper edge 36 of flange 16 and a pair of outwardly projecting, laterally spaced, horizontally aligned studs 38 located below, and vertically aligned with, the slots. Studs 38 are spaced below slots 34 the same distance as the spacing between slots 24 and studs 26 in plate 18.

Beam 10 is attached to column 12 in the manner shown in FIG. 3 by lowering the beam in a direction parallel to the column to move plate 18 into a position flush with flange 16. As plate 18 moves downwardly studs 26 are engaged in slots 34 of flange 16 while studs 38 of flange 16 are engaged in slots 24 of the plate.

Because beam 10 must be lowered vertically to employ the interconnecting device of the invention, any interconnection between the beam and column 12 below the upper ends of the columns must be offset laterally from the columns and this is accomplished by employing a bracket 40, as seen in FIGS. 1 and 3, fixed to column 12 for example by welding and having a vertical plate portion 42 carrying slots 34a and studs 38a. Where the upper edge of bracket 40 is turned inwardly to form a leg 44 the leg carries recesses 46 to pass heads 28 of the studs 26 of plate 18. Beam 10a is shortened in length to have plate 18 on the end of the beam abut plate 42 of bracket 40. As beam 10a is lowered, as seen in FIG. 3, studs 26 clear studs 38a and pass into slots 34a of bracket 40 while at the same time studs 38a pass into slots 24 of the plate.

In the embodiment shown in FIG. 2, column 12a is turned 90° to have flanges 16a of the column parallel to the axis of beam 10. In this embodiment plate 18 is inverted and fixed to flanges 16a of column 12a as plate 18a and a bracket 40a is also fixed to the flanges of the column as shown.

Plate 18 of beam 10 interlocks with inverted plate 18a of column 12 in the same manner as previously recited, i.e. plate 18 on beam 10a is moved vertically downward parallel to plate 18a on column 12a to have studs 26 engage in slots 24. To interlock beam 10a with column 12, bracket 40a is used in the same manner as bracket 40.

FIG. 4 of the drawings shows the interconnection of two beams 10 and 10b at right angles. Inverted plate 18b is fixed to flanges 16b and recesses 50 are located in the top flange to pass studs 26 of plate 18 on beam 10. Beam 10b is shown as being shallower in depth than beam 10 and plate 18b on beam 10b extends below the bottom flange of that beam. Of course two beams 10 could be interconnected end-to-end to form a continuous beam by using a pair of plates 18, one fixed to one end of each beam and inverted one with respect to the other.

In the alternate embodiment shown in FIGS. 5 and 6 of the drawings slots 24c of a plate 18c are tapered inwardly from edge 22c of the plate. Shanks 52 of studs 26c are similarly tapered to have a trapezoidal cross-section as shown in FIG. 6 to match the taper of slots 24c with the narrower side 54 of the shank being wider than the narrowest width of slot 24c. When plates 18c of this embodiment are interlocked, studs 26c will wedge into slots 24c to provide a frictional interconnection acting against lateral moments.

The alternate embodiment shown in FIG. 7 of the drawings also provides lateral forces acting against moments between plates 18. FIG. 7 shows a stud 26d in the form of a threaded bolt 60 having a shank knurled adjacent head 64 of the bolt which is face-fitted into an aperture 66 in plate 18. The free end portion 68 of bolt 60 is threaded to receive a nut 70. When plate 18 carrying studs 26d have been interconnected in the manner described above, nuts 70 are tightened against the plates to provide a lateral force acting against the moment forces transmitted to the column from the beam.

It will be appreciated that the device of the present invention provides a simple and efficient interconnection between a beam and a column or between two beams. Of course plate 18 does not have to be precisely vertical as long as the faces of the coupled plates are flush. Also, slots 24 of plate 18 would not have to be vertical except that the arrangement of the slots and studs in the interconnecting plates would have to be especially matched and it would not be possible simply to invert one of the plates. Again, plate 18 does not have to be rectangular. As seen in FIG. 8, a single slot 80 and a single stud 82 may be employed in each plate 18c and these may be laterally offset if desired. The number and location of the slots and studs, and the shape and dimensions of the plate may be designed to meet particular shear and moment conditions.

The term "stud" in the specification denotes a knob, head or boss standing out from a surface by means of a shank.

I claim:

1. A device for use in interconnecting two structural members, comprising plate means having a planar face and a circumferential edge, at least two parallel slots in the plate means extending from the edge of the plate means, and at least two studs projecting outwardly from the face of the plate means, the studs being arranged to be engagable in the slots of an inverted device of like construction.

2. A device as claimed in claim 1 in which the plate means has two of said slots and two of said studs, the slots being parallel one to the other, the closed ends of the slots and the studs forming a rectangle.

3. A device as claimed in claim 1 in which said plate means comprises a rectangular plate.

4. A device as claimed in claim 1 in which said stud comprises a bolt having a threaded shank projecting outwardly from the plate means and having a nut threaded on the free end thereof.

5. A device as claimed in claim 4 in which said bolt has a knurled shank portion adjacent the head thereof, the shank portion being press-fitted into an aperture in the plate means.

6. A device as claimed in claim 1 in which the slot tapers inwardly from the open end thereof.

7. A device as claimed in claim 6 in which the stud has a shank trapezoidal in cross-section, the two non-parallel sides of the shanks having planes converging at an angle equal to the angle of taper of the slot.

8. A device for interconnecting two structural members comprising:

plate means fixed vertically on one of the members, the plate means having a circumferential edge and a planar face, at least two parallel first slots extending upwardly from the edge of the plate means and at least two first studs projecting outwardly from the face of the plate means; and means on the other member for interengaging with said plate means, said interengaging means having a vertical planar face, at least two parallel second slots extending downwardly from a free upper edge of the interengaging means, and at least two second studs projecting outwardly from the face of the interengaging means, the first two studs being engageable in the second two slots and the second two studs being engagable in the first two slots on moving said one member vertically downward with respect to the other member.

9. A device as claimed in claim 8 in which the plate means has two of said first slots parallel one with the other and two of said first studs, the closed ends of the first slots and the first studs forming a rectangle, and in which the interengaging means on the other member has two of said second slots parallel one with the other and two of said second studs, the closed ends of the second slots and the second studs forming a rectangle.

10. A device as claimed in claim 8 in which the interengaging means comprises a bracket having a vertical plate portion outstanding from said other member.

11. A device as claimed in claim 10 in which the bracket comprises a channel member.

12. A device as claimed in claim 8 in which said one member is an I-beam and said other member is an I-column, said second slot being located in one flange of the column and extending downwardly from the top end thereof, said second stud extending outwardly from said one flange.

13. A device as claimed in claim 8 in which said one structural member is an I-beam and the upper edge portion of the plate abuts the end of the upper flange of the I-beam, and including a recess located in the lower flange of the I-beam contiguous one with said first slot to pass said second stud.

14. In a beam interconnectable with another structural member to form a structural unit:

a pair of plates each having a planar face and a circumscribing edge, at least two parallel slots in each plate extending inwardly from the edge thereof and at least two studs in each plate projecting outwardly from the face thereof;

one of said plates being fixed vertically to one end of the beam with the slots therein opening upwardly and the other of said plates being inverted and fixed vertically to said other structural member with the slots therein opening downwardly;

the two plates being interconnectable contiguously and in parallel one with the other on moving said beam downwardly whereby the studs of each plate enter the slots of the other plate.

15. A device as claimed in claim 14 in which each plate has a pair of said slots in parallel one with another and a pair of said studs, the closed ends of the slots and the studs forming a rectangle.

* * * * *